J. D. MARVIL.
CAR FENDER.
APPLICATION FILED AUG. 6, 1908.
954,754.
Patented Apr. 12, 1910.
2 SHEETS—SHEET 1.
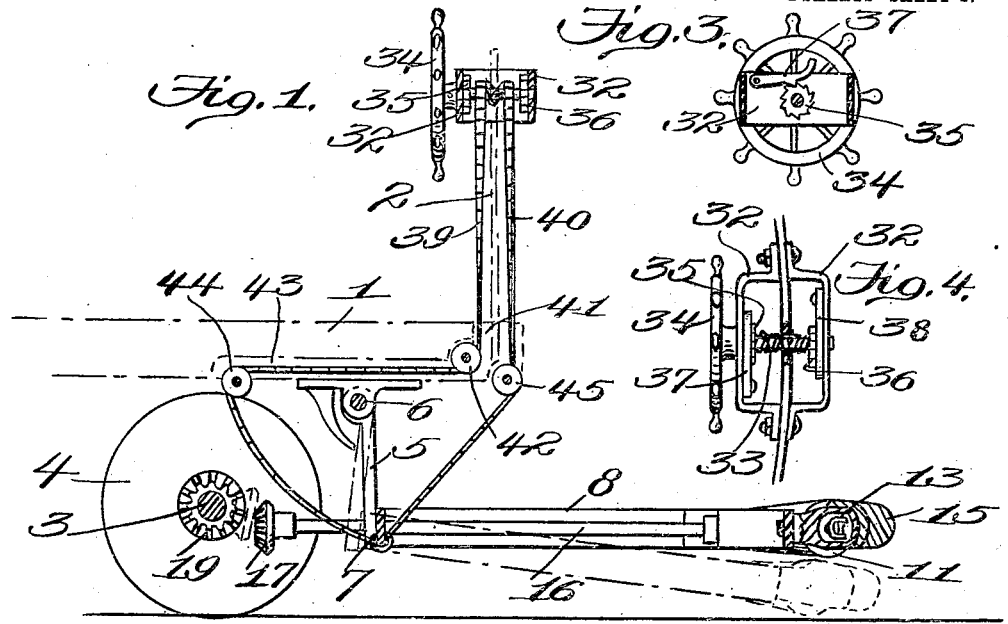
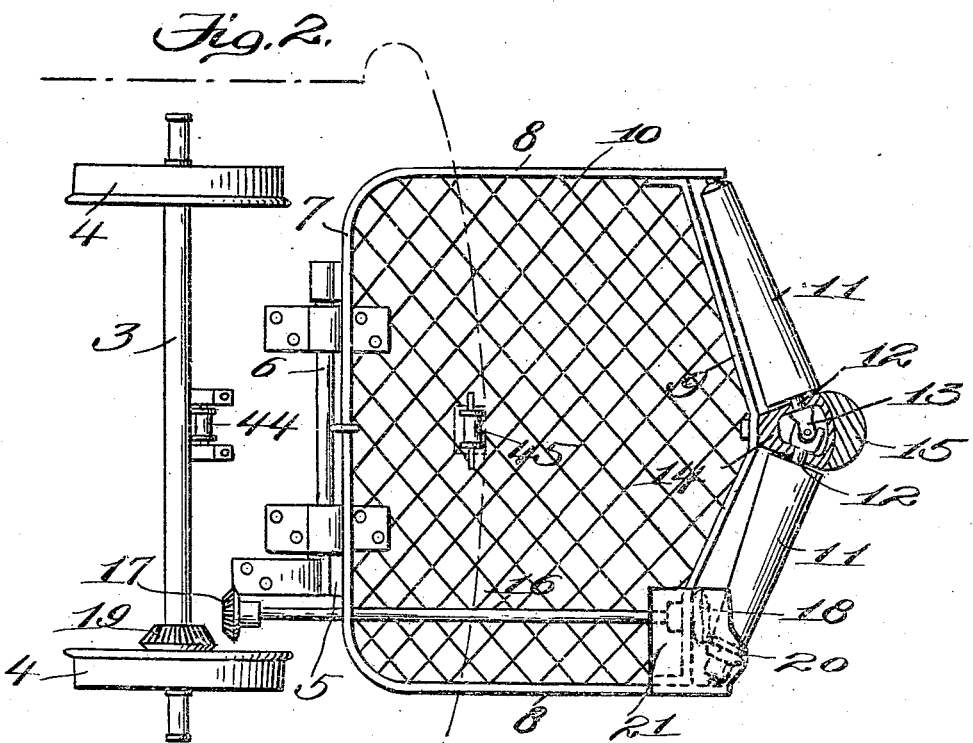
Witnesses:
G. F. Kesler
J. B. Keefer
Inventor
Joshua D. Marvil
By James L. Norris
Atty J. D. MARVIL.
CAR FENDER.
APPLICATION FILED AUG. 6, 1908.
954,754.
Patented Apr. 12, 1910.
2 SHEETS—SHEET 2.
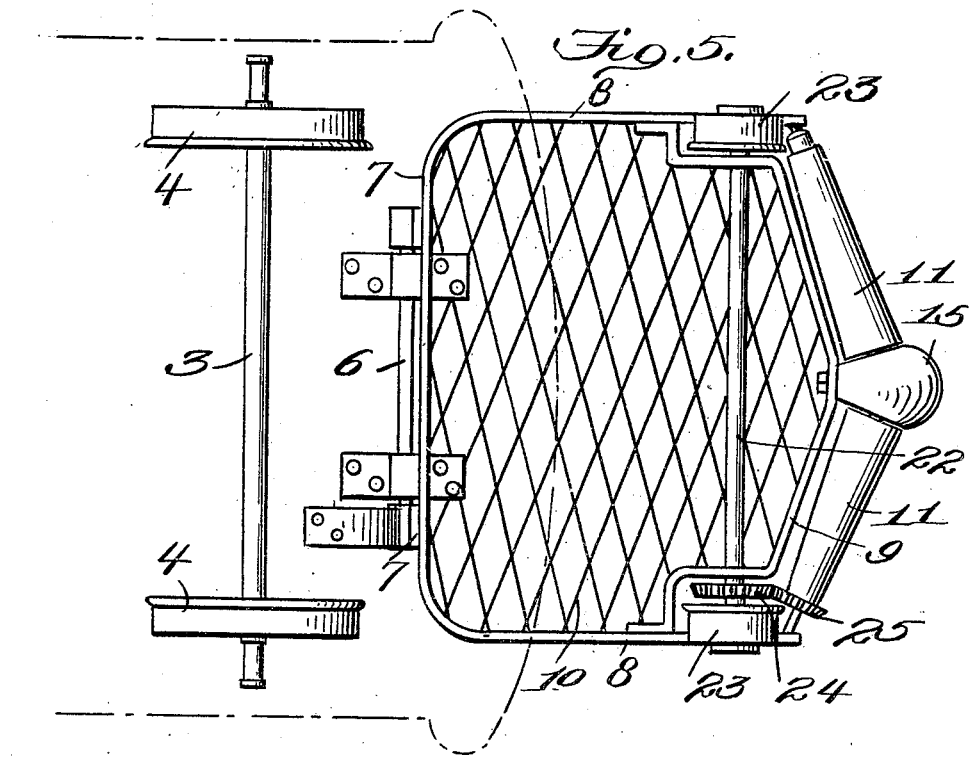
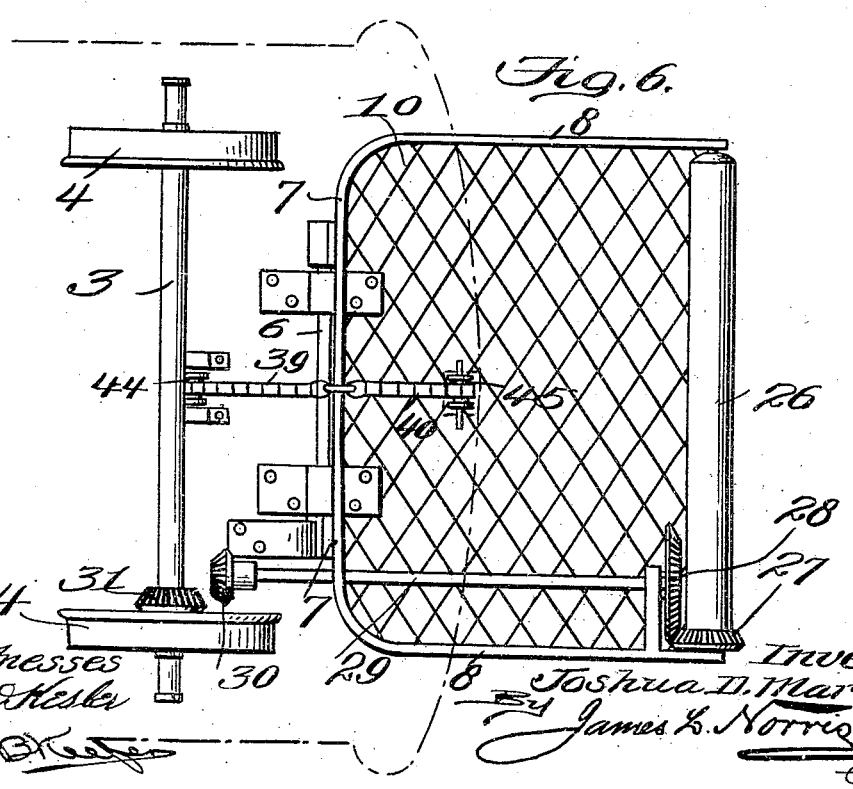

UNITED STATES PATENT OFFICE.

JOSHUA D. MARVIL, OF LAUREL, DELAWARE.

CAR-FENDER.

954,754.  Specification of Letters Patent.  Patented Apr. 12, 1910.

Application filed August 6, 1908. Serial No. 447,268.

*To all whom it may concern:*

Be it known that I, JOSHUA D. MARVIL, a citizen of the United States, residing at Laurel, in the county of Sussex and State of Delaware, have invented new and useful Improvements in Car-Fenders, of which the following is a specification.

This invention relates to car fenders particularly adapted for application to ordinary street cars but equally effective in service when applied to suburban or interurban cars.

The primary object of the invention is to provide a car fender which may be readily raised from the platform of the car and firmly locked down in operative position to prevent movement thereof independently of the movement of the car and insure constancy of position thereof with respect to the track rails and thus prevent persons or objects on the track and struck by the fender from passing under the latter. The fender is so arranged on the car end and has such position when lowered and in normal working condition as to preclude the possibility of injuring a person struck thereby by causing the struck person to be thrown over into the net or soft or yielding body covering forming the major portion of the fender. As an effective auxiliary, the fender is provided at its front extremity with a positively driven roller means which in some instances is arranged at reverse angles from the center toward opposite sides of the fender, and in other instances said means consists of a single roller extending straight across the front end of the fender, both roller means being driven by simplified gearing either actuated from the adjacent car axle or by a shaft rotatable in the fender and carrying track wheels. In the preferred construction and combined with the roller means and general fender organization is a flexible operating device which is controllable from the platform of a car to either elevate the fender without requiring the motorman to leave the car platform or to secure the fender against movement in close relation to the track rails over which it travels. The provision of means for raising the fender from the platform of the car without stopping the latter or requiring other loss of time is particularly advantageous in cramped places or narrow streets over and through which the car is required to move and demanding an elevation of the fender to avoid striking objects adjacent to the track or interfering with the movement of cars traveling in opposite directions. In the present instance the means for elevating the fender and for locking the same in lowered normal position is structurally reduced or simplified, and consists esentially of a single rotatable element movable in opposite directions to attain the two functions for which it has been devised and coacting therewith are locking means having reverse operating characteristics.

Other incidental features and details of construction will be more fully hereinafter explained, and in the drawings a preferred embodiment of the invention is illustrated in two forms and subject to such modifications as fairly fall within the scope of the claims.

In the drawings: Figure 1 is a longitudinal section of a portion of a car end showing the fender embodying the features of the invention applied thereto and also illustrated in section. Fig. 2 is a plan view illustrating the fender applied to the car end shown in dotted lines and including an operating car axle, the fender being partially in section. Fig. 3 is a cross section of the fender controller which is mounted on the car end. Fig. 4 is a top plan view of the fender controller and a portion of the dashboard to which it is preferably applied. Fig. 5 illustrates a plan view of a modified form of the fender, a car axle, and a portion of the platform in dotted lines. Fig. 6 is a view similar to Fig. 5 showing a further modification.

Similar characters of reference are employed to indicate corresponding parts in the several views.

The numeral 1 designates the platform of a car having a dash or dashboard 2, and for the purpose of illustrating the practical operation of the fender a forward car axle 3 having the usual flanged wheels 4 is also shown.

In applying the fender embodying the features of the invention to a car end or platform no material change is required in customary construction of such parts of the car, and in fact the fender and its attachments are applicable to any car now in use.

The attaching means for the fender consists of hangers 5 movably secured at their upper extremities to the under side of the car platform as at 6, the said hangers being positively or immovably attached to the back rail or member 7 of the fender frame and preferably continuous with side members or rails 8 which, as shown by Figs. 2 and 5, are connected by a cross-brace 9 near the front extremities of the said side rails.

The frame of the fender will be provided with a suitable net or other flexible covering 10, and in all forms shown the fender frame is substantially of the same construction.

Through the medium of the fulcrumed hangers 5 or equivalent devices the fender may be readily elevated in close relation to the dash 2 or lowered into operative position, and the preferred means for raising and lowering the fender and maintaining the latter in fixed position when lowered will be more fully hereinafter explained.

In the form of the fender shown by Figs. 1 and 2, two conical rollers 11 are rotatably mounted between the front extremities of the side rails 8 and inclined rearwardly in opposite directions from the center of the forward extremity of the fender. The rollers 11 have their reduced extremities adjacent to the ends of the rails 8 and may be constructed of any suitable material and in some instances by preference will have yielding characteristics. These rollers 11 are carried by shaft means 12 practically continuous through the medium of a knuckle 13 at the center and disposed in a closed bearing 14 supported by the brace 9, the front of the bearing 14 being provided with a forwardly projecting yielding or elastic buffer 15 to prevent injury to a person that may be struck by the central bar of the fender adjacent to the bearing 14 and also to materially relieve the fender of injurious shock or jar when coming into contact with a resisting object at the center. The rollers 11 are rotated inwardly or toward the netting 10 and by such operation a struck object is thrown over into the netting. Experience has shown that accidents and fatalities to persons struck by car fenders usually ensue at one side or the other of the longitudinal center of the fender or when a person has started to cross a track ahead of a car or just prior to leaving the track. To meet this contingency in either event the rollers 11 are disposed at the inclinations shown and are formed conical or tapered to shear off a person struck on either side of the longitudinal center of the fender or tend to push the person or object outwardly from the track in opposite lateral directions ahead of the fender. When this result fails, the angular disposition of the rollers is still effective in meeting a person or object squarely on either side of the longitudinal center of the fender and insure the person or object being thrown or directed into the fender frame onto the netting. The practically continuous shaft or shaft members carrying the rollers 11 may be operated in either one of two ways, and as shown by Fig. 2 a counter-shaft 16 extends longitudinally through the frame of the fender at one side of the longitudinal center of the latter and is provided with beveled pinions 17 and 18 on opposite ends, the pinion 17 being held in separable meshing relation to a pinion 19 fixed on and rotatable with the car axle 3. The pinion 18 is held in continual mesh with a pinion 20 on the outer extremity of one of the rollers 11, the pinions 18 and 20 having a surface shield or guard 21 thereover to prevent contact therewith of a person struck by and thrown into the fender over the said gearing. When the fender is fully lowered the pinion 17 will be disposed in full engagement with the pinion 19. When the fender is raised the pinion 17 gradually moves away from the pinion 19.

In the modified construction shown by Fig. 5 the rollers 11 and their shaft means are driven by mechanism independent in its operation of the car axle. In this instance a shaft 22 extends across the forward extremity of the fender frame and carries at opposite extremities small track engaging wheels 23, and near one of these wheels a gearing or pinion 24 is fixed on the shaft 22 to rotate therewith and held in continual mesh with a pinion 25 on the outer extremity of one of the rollers 11. In some applications of the fender this modified means for actuating the rollers 11 will be preferred. The fender as shown by Fig. 5 in other respects is similar to that illustrated by Figs. 1 and 2.

In Fig. 6 a further modification of the fender is shown and consists in providing the same with a single roller 26 extending straight across the front extremity of the frame and having on one end a beveled pinion 27 continually held in mesh with a corresponding pinion 28 on the forward end of a shaft 29 carried by the fender frame and provided with a rear pinion 30 adapted to mesh with a pinion 31 held on the car axle 3 in a manner similar to the mechanism for driving the rollers 11 shown by Fig. 2. The straight roller 26 is rotated inwardly or rearwardly with respect to the fender and may be constructed of any suitable material adapted for the purpose.

The fender operating controller is the same in all the forms of the fender illustrated and the main operating organization thereof is preferably disposed on the dash 2 within easy reaching distance of a motorman, and comprises essentially twin frame members 32 of duplicate construction secured against the inner and outer sides of the dash, as clearly shown by Fig. 4, and provides a box-like support through the center of which a rotatable element or winding member 33 extends, having a terminating bearing in the outer frame member 32 and projecting rearwardly through the inner frame member to receive a handwheel 34 simulating a capstan wheel and of such diameter as to afford the operator or motorman sufficient purchase to expeditiously rotate the element or member 33 in opposite directions. Fixed on the element or member 33 and held closely against the inner opposing sides of the frame members 32 are ratchet wheels 35 and 36 respectively having their teeth in reverse relation or projecting in opposite directions for engagement by reversely arranged dogs 37 and 38. Connected to opposite portions of the rotatable element or winding member 33 in advance and in rear of the dash 2 are the terminals of chain extremities 39 and 40. The chain extremities 39 and 40 are practically parts of a continuous chain which is preferably formed with flat links, or said chain may be replaced by any other flexible connecting device adapted for the purpose, though the chain as shown is preferred. The extremity 39 of the chain extends downwardly over the inner side of the dash 2 through an opening 41 in the platform, over a direction pulley 42 and continuous rearwardly in a horizontal plane through a groove 43 until it reaches a direction pulley 44 over which it is retained and from the latter pulley passes down and is secured to the lower portion of the center of the rear rail 7 of the fender. The extremity 40 of the chain passes downwardly over the outer side of the dash 2 and over a direction pulley 45 and from the latter to the rail 7 where it becomes practically continuous with the remaining portion of the chain. The extremities 39 and 40 of the chain wind in reverse directions on the rotatable element or winding member 33 so that when one extremity is wound on said element or member the other extremity is paid off or unwound. The winding of the extremity 40 on the element or member 33 in advance of the dash 2 results in an elevation of the fender, the rear extremity 39 of the chain under these conditions being gradually slackened to avoid obstructing the upward movement of the rear extremity of the fender. A reverse rotation of the element or member 33 will unwind the extremity 40 of the chain and wind or take up the slack of the extremity 39 and permit the fender to lower or be depressed into operative position, and when the fender has been fully lowered and the dog 37 thrown into locking engagement with the ratchet 35, upward movement of the fender will be obstructed in view of the fact that the extremity 39 will be held taut, and when both dogs 36 and 37 are in engagement with their respective ratchets the lock is still more effective. The fender may be raised and maintained at any elevation between its maximum lower and upper adjustments, and to avoid injury to the fender should any object be encountered in the track, and particulary an inert obstruction, the fender may be readily raised to pass over the said object from the platform of the car with comparatively little delay.

The fender is simple as well as strong and durable in its construction, and in view of the provisions for relieving the same of undue shock or jar and obstructing self-movement thereof its service will be materially prolonged as compared to the ordinary fenders now in use. By locking the fender against upward movement after it has been lowered in the manner explained a rocking movement of the car will cause the fender to move equally with the car with further advantages in preserving the construction of the fender.

Having thus described the invention, what is claimed as new, is:

1. The combination with a car, of a fender movably attached thereto, a winding device having locking means, and flexible means having portions reversely movable over the winding device, the extremities of the flexible means being connected to the rear part of the fender below the point of attachment of the latter and running to and from the fender from opposite directions, one portion of the flexible means acting against the other when drawn taut to lock the fender in depressed position.

2. The combination with a car, of a fender attached thereto and movably suspended therefrom, flexible means arranged in separated strands and connected to the rear part of the fender below the point of attachment of the latter and running to the fender from opposite directions, and winding means carried by the car, the separate strands of the flexible means having reverse movements on the winding means, the winding means operating on one strand in opposition to the other to lock the fender against movement.

3. The combination with a car, of a fender movably attached thereto, flexible means having parts running and connected to the rear portion of the fender for elevating and depressing the latter, the parts of the flexible means approaching the rear portion of the fender in opposite directions, and means for winding and unwinding the flexible means and for locking the parts of said flexible means, the flexible means when locked being drawn taut and the one part acting in opposition to the other part in preventing maximum elevation of the fender.

4. A movably mounted car fender having reversely movable flexible devices connected to the rear portion thereof for elevating and depressing the said fender and for locking the fender against movement when in depressed operative position, the flexible devices operating in reverse directions to set up an equal pulling action on the fender when serving as a lock for the latter.

5. The combination with a car platform having a dash, of a fender movably attached thereto, a winding member supported by the dash and having reversely operating locking devices associated therewith, and a flexible device having its terminals attached to opposite portions of the winding member and movable over the latter in reverse directions, the flexible device being connected to the fender for elevating and lowering the latter and serving as a lock means to hold the fender immovable when in its depressed operative position.

6. The combination with a car platform having a dash, of a fender movably attached to and suspended from the platform, a rotatable controller held by the dash, and flexible devices connected to the rear part of the fender below its point of attachment, the flexible devices having reverse winding association with the said controller, the controller being operative to set up an equal pulling strain on the flexible devices to lock the fender in depressed position.

7. The combination with a car platform having a dash, of a car fender movably associated with the platform, a controller held on the dash and comprising a rotatable member extending through the dash and carrying reversely arranged ratchets at opposite extremities, reversely arranged dogs coöperating with said ratchets, and a flexible device having its terminals connected to opposite portions of the said member to wind and unwind in reverse directions with relation to the latter, the flexible device being connected to the fender and serving to elevate and depress said fender.

8. The combination with a car platform, of a fender movably attached thereto, flexible means connected to the fender and extending upwardly above the platform for raising and lowering the fender, and mechanism for reversely winding and unwinding the opposite extremities of said flexible means and for locking the latter to prevent movement of the fender when in one of its positions.

9. The combination with a car platform, of a fender movably attached thereto, flexible means connected to the rear part of the fender for elevating and lowering the same, and means for operating the said flexible means and having reversely arranged locking devices to hold the flexible means against movement and maintain the fender in immovable depressed position.

10. The combination with a car, of a fender movably attached thereto, roller means at the front extremity of the fender, mechanism for positively rotating the said roller means toward the fender and solely engaging one extremity of the said roller means, the said mechanism including a rigid shaft carried by the fender and operated by rotating means engaging the track over which the car runs, the said shaft being elevated and depressed with the fender and rendered inactive when the fender is elevated, and means for elevating and depressing the fender and locking the latter in depressed position to maintain the said rigid shaft in active position.

11. The combination with a car, of a fender movably attached thereto, reversely disposed angularly arranged rollers at the front extremity of the fender having individual shafts movably connected at their inner extremities between the inner ends of the rollers, mechanism solely engaging the outer extremity of one roller for rotating both rollers and shafts rearwardly toward the fender, the said mechanism including a rigid shaft carried by and movable with the fender and extending rearwardly and having drive means to separably coöperate with the adjacent car axle and wheels, and means for elevating and depressing the fender, the shaft included in the mechanism for rotating the rollers being thrown out of and into engagement with the car axle and wheels respectively by the elevation and depression of the fender.

12. The combination with a car, of a fender movably attached thereto, conical rollers at the front extremity of the fender inclining rearwardly from the center of the latter and having their reduced extremities outermost, the rollers being provided with shaft means movably connected to practically form a continuous shaft, and mechanism engaging one roller for rotating both rollers rearwardly toward the body of the fender.

13. A car fender having rearwardly rotating roller means at its front extremity, the roller means being exposed for engagement with objects approached by the fender, gear devices operatively engaging one outer end of the said roller means, the gear devices being in part carried by one end of the roller means, and a guard plate located at one side of the forward extremity of the fender and disposed over the gear devices solely at one end of the roller means to shield the said gear devices and prevent contact therewith of objects taken up by and thrown rearwardly into the fender without interfering with the operative engagement of the roller means directly with said objects.

In testimony whereof I have hereunto set my hand in presence of two subscribing witnesses.

JOSHUA D. MARVIL.

Witnesses:
 ISAAC E. HEARN,
 NEWTON E. WARD.